United States Patent
Subramanian et al.

(10) Patent No.: US 11,824,589 B2
(45) Date of Patent: Nov. 21, 2023

(54) METHODS AND APPARATUS FOR COHERENT SIGNAL AMPLIFICATION AND DETECTION

(71) Applicant: University of York, York (GB)

(72) Inventors: Rupesh Kumar Parapatil Subramanian, York (GB); Timothy Paul Spiller, York (GB)

(73) Assignee: University of York, York (GB)

( * ) Notice: Subject to any disclaimer, the term of this patent is extended or adjusted under 35 U.S.C. 154(b) by 314 days.

(21) Appl. No.: 17/438,441

(22) PCT Filed: Mar. 13, 2020

(86) PCT No.: PCT/GB2020/050657
§ 371 (c)(1),
(2) Date: Sep. 12, 2021

(87) PCT Pub. No.: WO2020/183201
PCT Pub. Date: Sep. 17, 2020

(65) Prior Publication Data
US 2022/0158743 A1    May 19, 2022

(30) Foreign Application Priority Data

Mar. 14, 2019  (GB) .................................. 1903515

(51) Int. Cl.
*H04B 10/70* (2013.01)
*H04B 10/61* (2013.01)

(52) U.S. Cl.
CPC .......... *H04B 10/70* (2013.01); *H04B 10/612* (2013.01)

(58) Field of Classification Search
CPC ............................. H04B 10/70; H04B 10/612
(Continued)

(56) References Cited

U.S. PATENT DOCUMENTS 2,034,647 A * 3/1936 Beers ................ H04B 1/30
455/201
3,244,566 A * 4/1966 Kyser .................... H01L 29/00
438/545

(Continued)

FOREIGN PATENT DOCUMENTS

| CN | 104883227 A | 9/2015 |
| EP | 2034647 A1 | 3/2009 |
| EP | 3244566 A1 | 11/2017 |

OTHER PUBLICATIONS

Aniruddha Ghosh; A New Architecture for FPGA Implementation of a MAC Unit for Digital Signal Processors using Mixed Number System ; ACM:2012; pp. 33-37.*

(Continued)

*Primary Examiner* — Monjur Rahim
(74) *Attorney, Agent, or Firm* — Renner, Otto, Boisselle & Sklar, LLP

(57) ABSTRACT

A system for extracting data from a plurality of electromagnetic data signals encoding the data is provided. The system includes a phase modulator which receives an electromagnetic beam, and generates an electromagnetic primary reference beam with a defined phase. The system further includes one or more mixing units, each mixing unit being arranged to receive a respective one of the data signals and a reference beam, and to generate two mixed signals. The one or more mixing units include a first mixing unit for which the reference beam is the primary reference beam. The system also includes a plurality of detection units. Each detection unit is arranged to receive a respective one of the data signals and a respective mixed signal from one of the mixing units, and to obtain a difference measurement indicative of a difference between the respective data signal and the respective mixed signal. The difference measurements generated by the detection units are received by a summa- (Continued)

tion unit, which obtains a summed difference value indicative of the sum of the difference measurements.

21 Claims, 4 Drawing Sheets

(58) Field of Classification Search
USPC .......................................................... 380/256
See application file for complete search history.

(56) References Cited

U.S. PATENT DOCUMENTS

| | | | | |
|---|---|---|---|---|
| 3,617,398 | A * | 11/1971 | Bilous | H01L 27/0652 438/354 |
| 3,642,544 | A * | 2/1972 | Keyes | H01L 33/00 438/917 |
| 4,663,952 | A * | 5/1987 | Gelhard | G07C 9/00944 70/408 |
| 5,419,406 | A * | 5/1995 | Kawamoto | B60K 1/02 475/5 |
| 9,344,196 | B1 * | 5/2016 | Mashanovitch | H04B 10/5561 |
| 10,067,055 | B1 * | 9/2018 | Vakhshoori | G01J 3/4338 |
| 10,367,588 | B2 * | 7/2019 | Jensen | H04B 10/614 |
| 11,562,274 | B2 * | 1/2023 | Lee | G06N 7/01 |
| 2004/0075840 | A1 * | 4/2004 | Andersen | G01B 9/02004 359/349 |
| 2004/0109564 | A1 * | 6/2004 | Cerf | H04L 9/0858 380/256 |
| 2006/0263096 | A1 * | 11/2006 | Dinu | H04L 9/0858 398/187 |
| 2007/0201036 | A1 * | 8/2007 | Cooke | G01B 11/24 356/512 |
| 2009/0268901 | A1 * | 10/2009 | Lodewyck | H04L 9/0858 380/279 |
| 2012/0314867 | A1 * | 12/2012 | Tomaru | H04L 9/08 380/270 |
| 2013/0230317 | A1 * | 9/2013 | Ye | H04B 10/07955 398/38 |
| 2014/0303112 | A1 * | 10/2014 | Chen | C07D 239/54 514/263.1 |
| 2016/0178439 | A1 * | 6/2016 | Freudiger | G01J 3/44 356/301 |
| 2016/0352515 | A1 * | 12/2016 | Bunandar | H04L 9/0852 |
| 2017/0026633 | A1 * | 1/2017 | Riza | H04N 13/239 |
| 2017/0170908 | A1 * | 6/2017 | Sternklar | H04B 10/50577 |
| 2017/0237505 | A1 * | 8/2017 | Lucamarini | H04L 9/0858 398/185 |
| 2017/0343652 | A1 * | 11/2017 | de Mersseman | G01S 7/4912 |
| 2018/0048045 | A1 * | 2/2018 | Kikuchi | H01P 5/107 |
| 2018/0132016 | A1 * | 5/2018 | Kamalov | H04Q 11/0062 |
| 2018/0150579 | A1 * | 5/2018 | Sarpeshkar | G06N 7/01 |
| 2018/0278456 | A1 * | 9/2018 | Sternklar | H04L 27/361 |
| 2018/0367301 | A1 * | 12/2018 | Su | H04L 9/0894 |
| 2019/0086518 | A1 * | 3/2019 | Hallstig | G01S 7/4812 |
| 2019/0121349 | A1 * | 4/2019 | Cella | G06Q 50/00 |
| 2019/0226908 | A1 * | 7/2019 | Rao | G01H 9/004 |
| 2019/0265351 | A1 * | 8/2019 | Madison | G01S 17/32 |
| 2020/0389299 | A1 * | 12/2020 | White | H04B 10/85 |
| 2021/0086370 | A1 * | 3/2021 | Zhang | B25J 9/0084 |

OTHER PUBLICATIONS

International Search Report for corresponding Application No. PCT/GB2020/050657, dated Jul. 15, 2020.
Written Opinion for corresponding Application No. PCT/GB2020/050657, dated Jul. 15, 2020.
Search Report for Corresponding UK Application No. GB1903515.3, dated Sep. 10, 2019.
Adrien Marie et al; "Self-coherent phase reference sharing for continuous-variable quantum key distribution", Physical Review A, vol. 95, No. 1, Jan. 1, 2017.
Jian Fang, Peng Huang and Guihua Zeng, "Multichannel parallel continuous-variable quantum key distribution with Gaussian modulation", Phys. Rev. A, vol. 89, Issue 2, Feb. 12, 2014.

* cited by examiner (A)  (B)

METHODS AND APPARATUS FOR COHERENT SIGNAL AMPLIFICATION AND DETECTION

FIELD OF THE INVENTION

The present invention relates to apparatus and methods for coherent signal amplification and detection.

BACKGROUND OF THE INVENTION

Coherent signals are widely used as data carriers in high-speed classical communications. In such communications, information may be encoded on the amplitude and phase (or, equivalently, the 'quadratures', i.e. the real and imaginary parts $\hat{x}$ and $\hat{p}$ of the complex amplitude $\alpha$ of a coherent beam) of the signal.

Using coherent data signals, attenuated down to the quantum level, cryptographic keys may be securely exchanged between two legitimate users—that is, "continuous variable quantum key distribution" (CV-QKD) can be performed. Each user is provided with a system ("receiver system") for extracting data from the data signals sent by the other user.

For cryptographic purposes such as CV-QKD, where the secrecy is provided by the vacuum noise of the quantum coherent signals, a vacuum noise sensitive receiver system is required in order to read out the quadrature values. This is to detect the presence of a possible eavesdropper who is typically assumed to be equipped with quantum resources for quantum signal measurements, and is necessary to verify the security of the key transmission. Therefore, unlike classical coherent signal detection systems, quantum coherent signal detection systems require detectors having a sensitivity at the level of vacuum noise ('shot-noise limited').

Sensitivity to the vacuum noise ('shot-noise sensitivity') is conventionally achieved by using a high-intensity reference signal generated by a "local oscillator" (such as a laser). Note that the term "local" does not imply that the oscillator is proximate the rest of the receiver system; it may alternatively be provided remotely from the receiver system, e.g. even at the data transmitter system of the other user.

Specifically, in the receiver system, the coherent data signal is first mixed by a symmetric beam-splitter with the high-intensity reference electromagnetic signal generated by a local oscillator. Due to constructive and destructive interference in the beam-splitter, this mixing generates two distinct output signals ("mixed signals"). The mixed signals are detected using a detection unit which comprises two linear PIN photo-diodes which receiver the respective mixed signals. The output photocurrents of the two diodes are subtracted from one another, and the resultant photocurrent difference is amplified by a low electronic noise linear current amplifier. One or more quadrature values of the coherent signal may be determined from the amplifier output current. By orienting the phase of the local oscillator to 0 or 90 degrees with respect to the signal phase, either of the two orthogonal quadrature values of the coherent signal may be measured. Measuring one of the orthogonal quadrature values may be done by using detector units which perform homodyne detection. Alternatively, both orthogonal quadrature values of a coherent signal may be measured by using detector units which perform heterodyne detection.

The output intensity of the local oscillator and the electronic noise level of the linear amplifier are limiting factors of the signal to noise ratio (SNR) in long-distance CV-QKD (for example, CV-QKD wherein the signals are transmitted over a distance exceeding 100 km). The shot-noise sensitivity of a quantum coherent signal detection system may be improved by increasing the output power of the local oscillator. However, the local oscillator output power cannot be made arbitrarily high, as the detectors in a coherent signal detection system have a finite saturation power and are not able to measure signals where the local oscillator output power exceeds this threshold. Indeed, if a photodiode receives excessive energy it may even be damaged. A typical maximum input power value for a linear PIN photo-diode is about 10 mW. Consequently, the shot-noise sensitivity of conventional systems is limited. Furthermore, if the repetition rate (the number of signals sent per second) is high, the maximum local oscillator output intensity may be limited by the output power capacity of the local oscillator itself (for example, if a coherent laser is used as a local oscillator, the peak power of the coherent laser).

STATEMENT OF INVENTION

The present invention aims to provide a new and useful receiver system for extracting data from electromagnetic signals transmitted by a transmitter system, and a method for extracting data from a plurality of electromagnetic data signals encoding the data.

The present invention proposes in general terms that one or more mixing units of a receiver system are used to distribute the power of a reference beam used for coherent signal measurement across a plurality of detection units, so that the power of the reference beam may be increased without exceeding the saturation power of any detection unit.

Each mixing unit and/or detection unit may receive a respective one of a plurality of substantially coherent electromagnetic signals which collectively encode data, e.g. by each data signal separately encoding that data (e.g. the data signals may be substantially identical, except perhaps with respect to the timing at which they arrive at the receiver system), or each data signal encoding a respective part of the data, or by the data being encoded in differences between pairs of the data signals. The signals are here referred to as "data signals" or "modes".

From another point of view, the invention proposes in general terms that a reference signal received by a mixing unit together with a data signal, is a mixed signal which has been generated by another mixing unit using a different data signal, where the two data signals collectively encode data.

One specific expression of the invention provides a receiver system for extracting data from a plurality of electromagnetic data signals collectively encoding the data, comprising:
  a phase modulator for receiving an electromagnetic beam, and generating an electromagnetic primary reference beam with a defined phase;
  one or more mixing units, each mixing unit being arranged to receive a respective one of the data signals and a reference beam, and to generate two mixed signals, the one or more mixing units including a first mixing unit for which the reference beam is the primary reference beam;
  a plurality of detection units, each detection unit being arranged to receive a respective one of the data signals and a respective mixed signal from one of the mixing units, and to obtain a difference measurement indicative of a difference between the respective data signal and the respective mixed signal; and a summation unit, arranged to receive the difference measurements generated by the detection units, and to obtain a summed difference value indicative of the sum of the difference measurements.

The above-described configuration allows the signal amplification level in coherent signal detection to be increased by distributing the power of the electromagnetic primary reference beam across a plurality of detection units. Hence, the electromagnetic primary reference beam power may be increased compared to conventional systems without damaging the detection units.

This configuration also permits collective detection of plural data signals encoding different respective information. Where the system is used for CV-QKD, this configuration also increases the overall bandwidth of the cryptographic key transmission, and the higher reference beam power provides an improved SNR for long-distance CV-QKD.

In an embodiment, the system comprises a plurality of mixing units, composed of the first mixing unit and one or more additional mixing units, each additional mixing unit being arranged to receive a respective data signal and a mixed signal generated by another of the mixing units. Optionally, the mixing units could be arranged in a hierarchical array having at least two successive layers, wherein the first layer comprises the first mixing unit, and each other layer of the array comprises, for each mixing unit of the preceding layer, a corresponding pair of mixing units which each receive a respective mixed signal generated by that mixing unit of the preceding layer. Hence, the magnitude of a mixed signal output by a given layer is reduced further in the successive layer of the hierarchical array by passing through a mixing unit, and thereby being divided into two mixed signals. The mixed signals output by the last layer may be input to respective detection units together with respective data signals. Thus, the hierarchical array reduces the intensity of the respective mixed signals incident on each detection unit, allowing a higher-intensity primary reference beam to be implemented than in a conventional system without the intensity at any detection unit exceeding a pre-determined threshold value.

In an embodiment, the summed difference value obtained by the summation unit may be received by an amplifier to generate an amplified difference value. For example, the amplifier may be a linear current amplifier with low electronic noise, the electronic noise being preferably at least 10 dB below the shot-noise level.

In an embodiment, the system may be provided with one or more delay units, positioned to modify a delay of a data signal or a mixed signal before that signal is received by a mixing unit or a detection unit, for example by modifying the time taken for a data signal or mixed signal to propagate between two components in the system. Such an embodiment may be used to measure a plurality of data signals in a case where the data signals would otherwise arrive at the detection units at different times, by varying the delay introduced on each path so as to compensate for the different arrival times of the data signals. Alternatively, such an arrangement may be used to introduce or increase a delay between the arrival of two signals at a given detection unit or mixing unit.

In an embodiment, the system may comprise collimating element(s) for collimating data signals and/or mixed signals before they reach the corresponding mixing unit(s) or detection unit(s). For example, there may be at least three collimating elements arranged to receive and collimate data signals travelling on a path towards at least one mixing and two detection units. This increases the data signal collection efficiency of the mixing unit and two detection units. Collimation elements can be located at the input of the mixing unit and detection units or prior to the photo-diodes in detection units.

In an embodiment, the system may further include a receiver array comprising a respective set of spaced-apart signal receiver units arranged to receive the respective data signals and transmit them to the corresponding ones of the mixing units and detection units.

The receiver system may receive data signals generated by a single-input-to-multiple-output beam splitter located at the transmitter system. Alternatively, the transmitter system may include a set of transmitter units distributed in space for generating the corresponding data signals. Subsequently, in both cases, the data signals propagate on different respective paths and so are referred to as different spatial modes of the input electromagnetic signal. The propagation paths may for example be through a free-space channel, generally with the same polarization. The receiver system may include multiple receiver units (e.g. in an array) for receiving corresponding ones of the spatial modes as respective data signals. In an embodiment, the system could be adapted to perform homodyne detection. That is, each detection unit in the system is adapted to perform homodyne detection, i.e. to measure one of the orthogonal quadrature values of the respective received data signal at a time. In each homodyne detection unit, a phase modulator receives the respective mixed signal and orients the phase of the respective mixed signal at either 0° or 90° to the phase of the respective data signal received by each detection unit so as to select one of the two orthogonal quadrature values to be measured. The phase-modulated respective mixed signal may then be mixed with the respective data signal, allowing the selected quadrature value to be measured. Advantageously, in a system configured to perform homodyne detection, the system may receive signals over a greater distance than a corresponding system configured to perform heterodyne detection.

The frequencies of the electromagnetic beam and data signals may be substantially equal. For example, in an embodiment wherein the system is configured to receive signals having a repetition rate of 1 MHz over a distance of 25 km or more, the electromagnetic beam and the data signals could each have a frequency line width of 50 kHz or less, with the electromagnetic beam and data signals having a common central frequency. In a variant of the embodiment wherein the system is configured to receive signals over a distance of 50 km or more, the electromagnetic beam and data signals may each have a frequency linewidth of 1 kHz or less.

Alternatively, in an embodiment where the system is configured to receive signals having a higher repetition rate, the electromagnetic beam and data signals may each have a frequency linewidth on the order of 10 MHz or less, with the electromagnetic beam and data signals having a common central frequency. Optionally, the electromagnetic beam and data signals could both be derived from a single source—for example, both the electromagnetic beam and the input electromagnetic signal could in an embodiment be derived from the same source.

Alternatively, the system could be adapted to perform heterodyne detection. That is, each detection unit in the system is adapted to perform heterodyne detection, i.e. to measure both orthogonal quadrature values of the respective received data signal at a time. In each heterodyne detection unit, the respective data signal and respective mixed signal received by each detection unit may each be divided using a symmetric beam-splitter, generating a first respective data sub-signal, second respective data sub-signal, first respective mixed sub-signal, and second respective mixed sub-signal.

The first respective mixed sub-signal is then received by a first phase modulator, the first phase modulator being configured to orient the phase of the first respective mixed sub-signal at 0° with respect to the phase of the first respective data sub-signal. The phase-modulated first respective mixed sub-signal may then be mixed with the first respective data sub-signal, allowing the x̂-quadrature of the respective data signal to be measured. The second respective mixed sub-signal is received by a second phase modulator, the second phase modulator being configured to orient the phase of the second respective mixed sub-signal at 90° with respect to the phase of the second respective data sub-signal. The phase-modulated second respective mixed sub-signal may then be mixed with the second respective data sub-signal, allowing the p̂-quadrature of the respective data signal to be measured.

Advantageously, in a system configured to perform heterodyne detection, both the orthogonal quadrature values of a data signal may be measured, and the security of the cryptographic key transmission may be increased.

In an embodiment, the receiver system may further comprise one or more local oscillators configured to generate the electromagnetic beam. Optionally, the one or more local oscillators may be coherent lasers. Each coherent laser may have a narrow linewidth of the order of kHz or lower, with the one or more coherent lasers having a common central frequency.

Alternatively, the electromagnetic beam may be generated remotely from the receiver system using an electromagnetic beam source, and transmitted over a quantum transmission channel to an interface unit comprised in the receiver system. The distance between the electromagnetic beam source and the interface unit may be between 0 and 100 km. Optionally, the interface unit could be the same as one of the receiver units, and both the electromagnetic beam and the input electromagnetic signal could be generated remotely and transmitted over the same quantum transmission channel to the interface unit. The electromagnetic beam may then be separated from the input electromagnetic signal, for example by means of a beam splitter. For example, the electromagnetic beam and the input electromagnetic signal may have different polarization states, and be split using a polarization beam splitter (PBS) followed by respective polarizers arranged to receive the outputs of the PBS and to output the electromagnetic beam and the input electromagnetic signal respectively.

In an embodiment, the system may further comprise at least one additional phase modulator located on a path of one of the mixed signals between two mixing units. The at least one additional phase modulator is arranged to receive the one of the mixed signals output by a first one of the two mixing units, and transmit it to a second one of the two mixing units with a defined phase. This allows a phase relationship between the mixed signal and a data signal to be interfered with the mixed signal in the second one of the two mixing units, to be defined more accurately before interference takes place.

BRIEF DESCRIPTION OF THE DRAWINGS

An embodiment of the invention will now be described, for the sake of example only, with reference to the following drawings, in which.

DETAILED DESCRIPTION OF THE EMBODIMENTS

Figure 1:
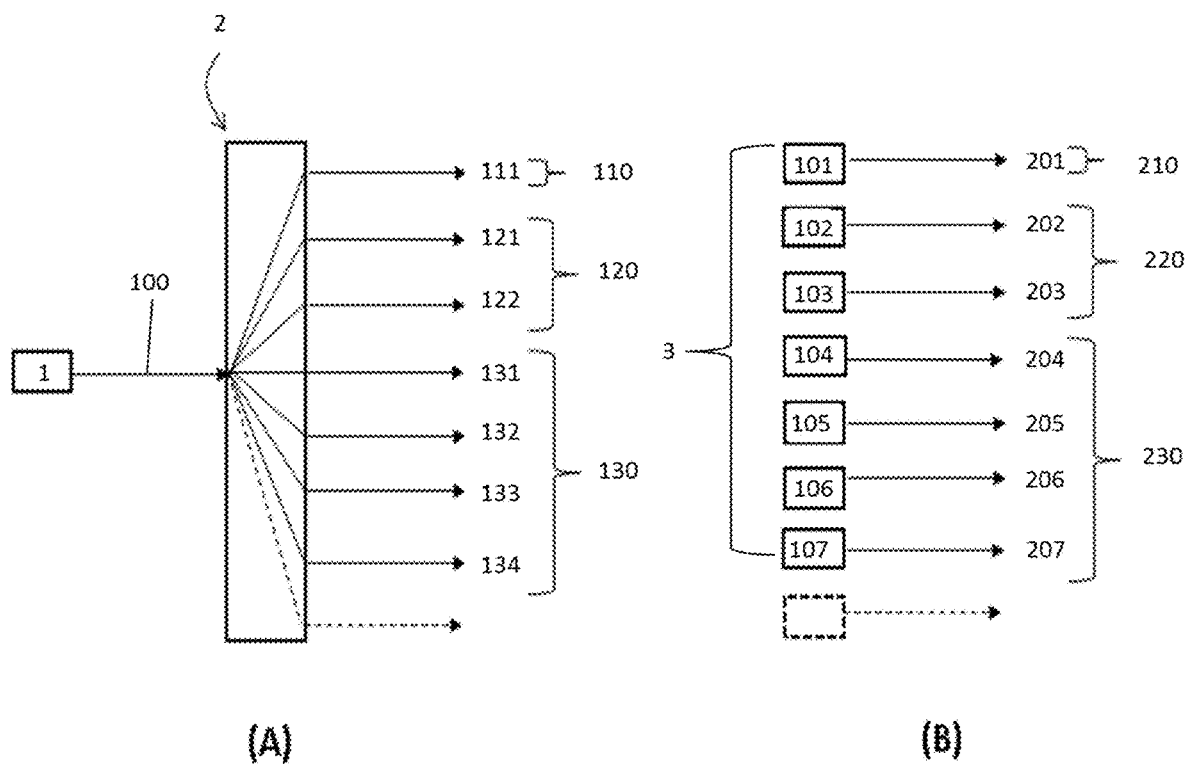
FIG. 1, which is composed of FIGS. 1(A) and 1(B), shows methods for obtaining, in a transmitter system, multiple data-encoding data signals for measurement by a system according to an embodiment of the invention.

FIG. 1(A) shows the generation, in a transmitter system of a communication system, of multiple electromagnetic data signals (111, 121, 122, 131, 132, 133, 134) from a single input electromagnetic data signal 100 which is received from (e.g. generated by) a transmitter unit 1. The electromagnetic data signal 100 encodes data to be transmitted to a receiver system. The input electromagnetic data signal 100 received from the transmitter unit 1 is incident on a beam-splitter 2, which receives the input electromagnetic data signal (100) and divides it to form the plurality of data signals (111, 121, 122, 131, 132, 133, 134). In the embodiment shown, the data signals are divided into groups (110, 120, 130). Each group includes a number of data signals which is $2^n$ for a respective value of n.

FIG. 1(B) shows, in an alternative transmitter system, a transmitter array 3 comprising signal transmitter units (101, 102, 103, 104, 105, 106, 107), each signal transmitter unit being spaced from the other signal transmitter units and arranged to transmit a respective data signal (201, 202, 203, 204, 205, 206, 207). In the embodiment shown, the data signals are divided into groups (210, 220, 230). Each group includes a number of data signals which is $2^n$ for a respective integer value of n. The total number of data signals is $2^{m+1}-1$, for a respective integer value of m.

Figure 2:
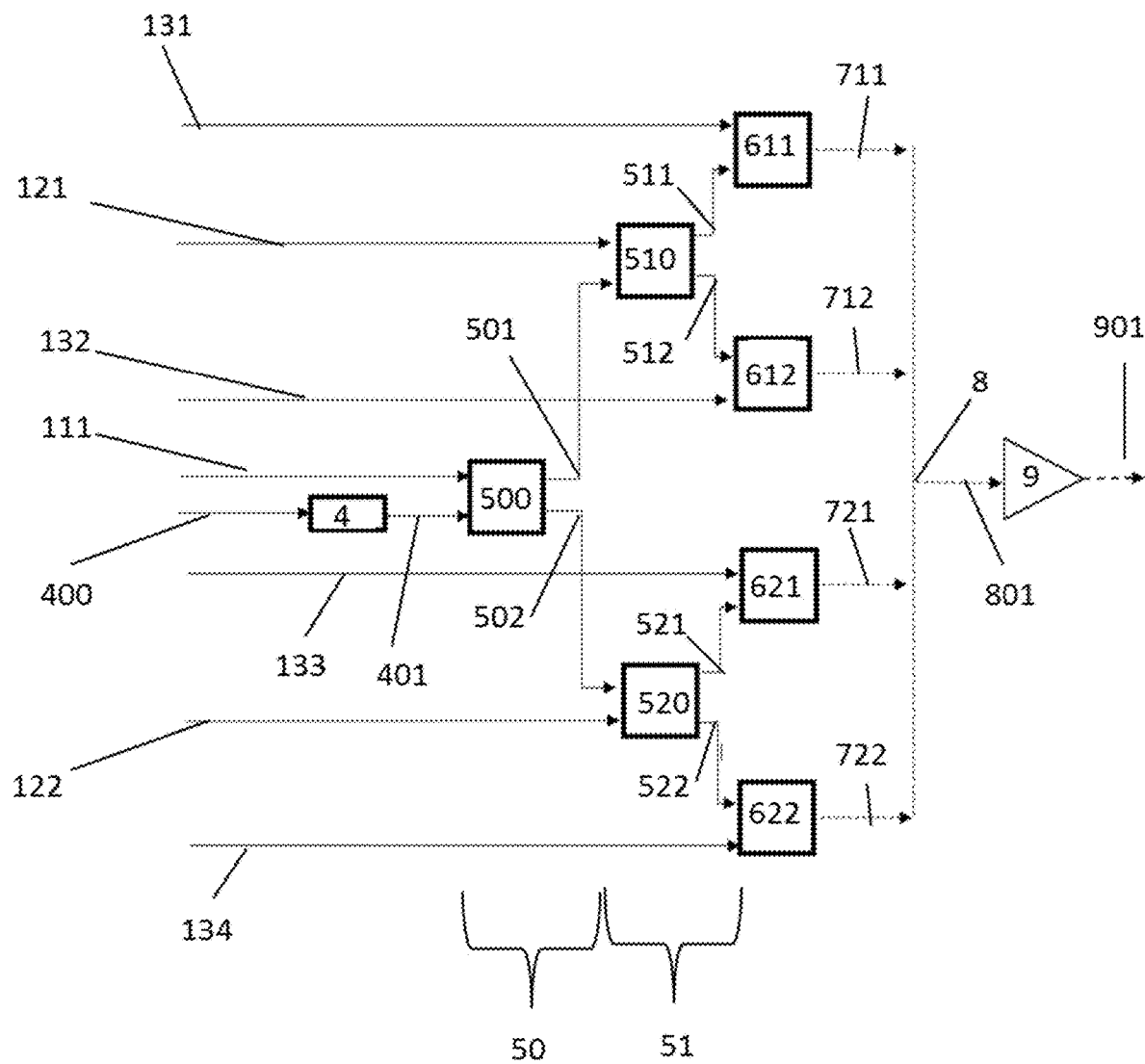
FIG. 2 shows the optical layout of a receiver system which is an embodiment of the invention, and which is arranged to receive the data signals generated by a transmitter system as shown in FIG. 1.

FIG. 2 shows a receiver system according to an embodiment of the invention. Although not shown in FIG. 2, the receiver system has an array of $2^n$ receiver units for receiving the respective data signals generated by a transmitter system which has the form shown in FIG. 1A or FIG. 1B.

A first input to the system is a substantially coherent electromagnetic beam 400. The electromagnetic beam 400 may be generated by a coherent laser of the system (not shown). Alternatively, it may be generated by combining outputs of a plurality of coherent layers, which are controlled such that the electromagnetic beam is coherent. Alternatively, the electromagnetic reference beam 400 may be received from a remote location. Optionally, one of the receiver units, in addition to receiving the corresponding data signal, receives the electromagnetic reference beam 400 with a different polarization, so that the two can be separated using polarizers.

Additional inputs to the system are the set of data signals, which are received by respective ones of the receiver units. FIG. 2 illustrates the data signals as being the signals 111, 121, 122, 131 132, 133, 134 output by the transmitter system of FIG. 1(A). Alternatively, in a variant of the embodiment the data signals input to the receiver system may be the data signals 201, 202, 203, 204, 205, 206, 207 generated by the transmitter system in FIG. 1(B).

Returning to FIG. 2, the electromagnetic beam 400 is received by a phase modulator 4, which generates an electromagnetic primary reference beam 401 having a defined phase. The electromagnetic primary reference beam 401 and data signal 111 are then received by first mixing unit 500, generating mixed signals 501 and 502. Mixed signals 501 and 502 are directed to mixing units 510 and 520 respectively, where mixed signal 501 is combined with data signal 121 and mixed signal 502 is combined with data signal 122, generating mixed signals 511 and 512, and 521 and 522 respectively. Mixed signals 511, 512, 521, and 522 are received with the respective remaining data signals 131, 132, 133, and 134 by respective detection units 611, 612, 621, and 622.

Thus, in the embodiment of FIG. 2, the system comprises a hierarchical array of mixing units having two successive layers 50 and 51. The first layer 50 comprises the first mixing unit 500 which receives the electromagnetic primary reference beam 401 and data signal (111) in group 110, producing mixed signals 501 and 502 which are then directed into the mixing units 510 and 520 of the second layer 51 respectively. The mixing units 510 and 520 in the second layer 51 then receive mixed signals 501 and 502 and data signals (121, 122) in group 120, generating mixed signals (511, 512, 521, 522). Mixed signals (511, 512, 521, 522) generated by mixing units 510 and 520 are then directed to respective detection units (611, 612, 621, 622) where they are combined with respective data signals (131, 132, 133, 134) in group 130 to generate difference values (711, 712, 721, 722). In this way, each of the data signals is combined with a respective electromagnetic primary reference beam 401 or mixed signal. That is, this configuration allows the seven data signals to each be combined respectively with the electromagnetic primary reference beam 401 or a respective reference beam which is a mixed signal.

In an alternative embodiment, the hierarchical array may comprise more than two successive layers of mixing units, allowing the system to be scaled arbitrarily. Optionally, the hierarchical array could comprise m successive layers of mixing units, each successive layer of the array comprising, for each mixing unit of the preceding layer, a corresponding pair of mixing units which each receive a respective mixed signal generated by that mixing unit of the preceding layer. This configuration allows $2^{m+1}-1$ data signals to each be combined respectively with the primary reference beam 401 or a respective reference beam which is a mixed signal.

The difference values (711, 712, 721, 722) output by the detection units (611, 612, 621, 622) are directed to a summation unit 8, which receives and sums the photocurrent difference values (711, 712, 721, 722) to obtain a summed difference value 801. The summed difference value 801 is then received and amplified by an amplifier 9 to obtain an amplified difference value 901.

Figure 3:
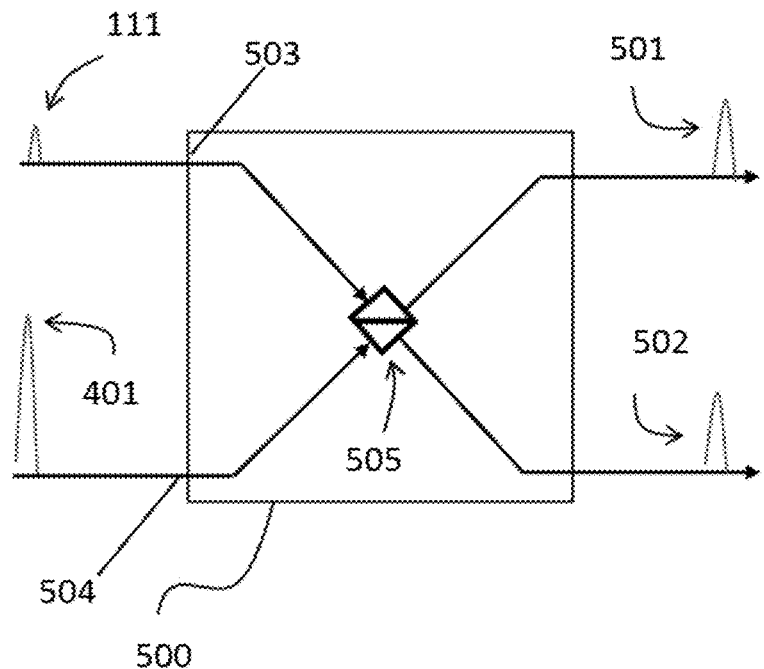
FIG. 3 shows the operation of a mixing unit in the embodiment of the invention.

FIG. 3 shows the operation of the mixing unit 500 in an embodiment of the invention. All the other mixing units of FIG. 2 have the same construction. The mixing unit 500 comprises a beam-splitter 505 arranged to receive the data signal 111 and electromagnetic primary reference beam 401 through input ports 503 and 504. A high degree of mutual coherence between the data signal 111 and electromagnetic primary reference beam 401 is required for interference to take place. In one example, the data signal 111 and electromagnetic primary reference beam 401 may be derived from the same source. Alternatively, the data signal 111 and electromagnetic primary reference beam 401 may be derived from two lasers, each laser having a low frequency linewidth, wherein the two lasers have substantially the same central frequency.

Data signal 111 and electromagnetic primary reference beam 401 interfere in beam-splitter 505, yielding distinct mixed signals 501 and 502 as a result of constructive and destructive interference in the beam-splitter 505. The beam-splitter 505 is a symmetric beam-splitter, i.e. a beam-splitter having a reflectance value of substantially 50%, for example 50±1%, and a transmittance value of substantially 50%, for example 50±1%, within a wavelength range of interest. The wavelength range of interest may lie substantially within the visible range of the electromagnetic spectrum, i.e. from approximately 380 nm to approximately 740 nm. Alternatively, the wavelength range of interest may lie within the wavelength range 1525 nm-1565 nm, or lie within the wavelength range 1310 nm-1550 nm. (These wavelength ranges are exemplary and not intended to be limiting.) In general, the wavelength range of interest of the beam-splitter 505 may include, or overlap substantially with, a range in which the wavelengths of the data signal 111 and electromagnetic primary reference beam 401 lie.

Figure 4:
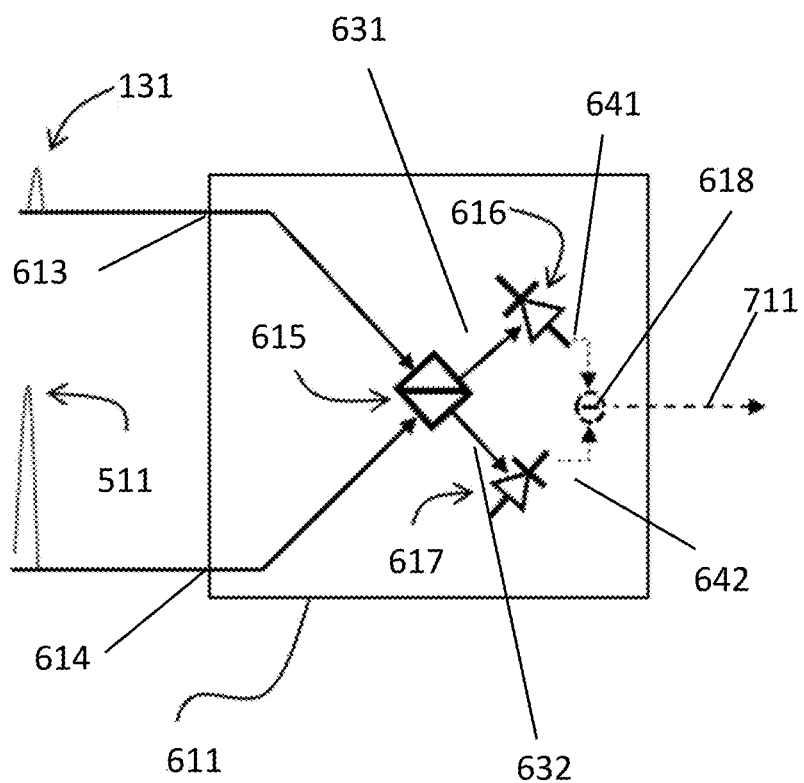
FIG. 4 shows the operation of a detection unit in the embodiment of the invention.

FIG. 4 shows the operation of a homodyne detection unit 611 in an embodiment of the invention. All the other detection units of FIG. 2 have the same construction. Data signal 131 and mixed signal 511 are received through input ports 613 and 614 and interfere in the symmetric beam-splitter 615. Constructive and destructive interference in symmetric beam-splitter 615 yields distinct mixed signals 631 and 632. Mixed signals 631 and 632 are then received by respective reverse-biased photodiodes 616 and 617, generating respective photocurrents 641 and 642. Photocurrents 641 and 642 are then subtracted from one another in subtraction circuit 618, producing photocurrent difference 711 (difference measurement).

The photocurrent difference 711 obtained is proportional to one of the orthogonal quadrature values of data signal 131 (as the detection unit 611 is a homodyne detection unit, only one of the orthogonal quadrature values may be measured at a time), with the phase relationship between mixed signal 511 and data signal 131 determining which of the two orthogonal quadrature values is measured. The orthogonal quadratures of the data signals (111, 121, 122, 131 132, 133, 134) generally encode different information. A phase difference of 0° between the data signal 131 and mixed signal 511 yields a photocurrent difference 711 which is proportional to the $\hat{x}$ quadrature eigenvalue of the data signal 131, whilst a phase difference of 90° yields a photocurrent difference 711 which is proportional to the $\hat{p}$-quadrature eigenvalue of the data signal 131. In an embodiment, the photocurrent difference 711 is proportional to one of the quadrature values of the data signal 131 and also to one of the quadrature values of the input data signal 100 from which the data signals (131, 132, 133, 134) are derived.

Figure 5:
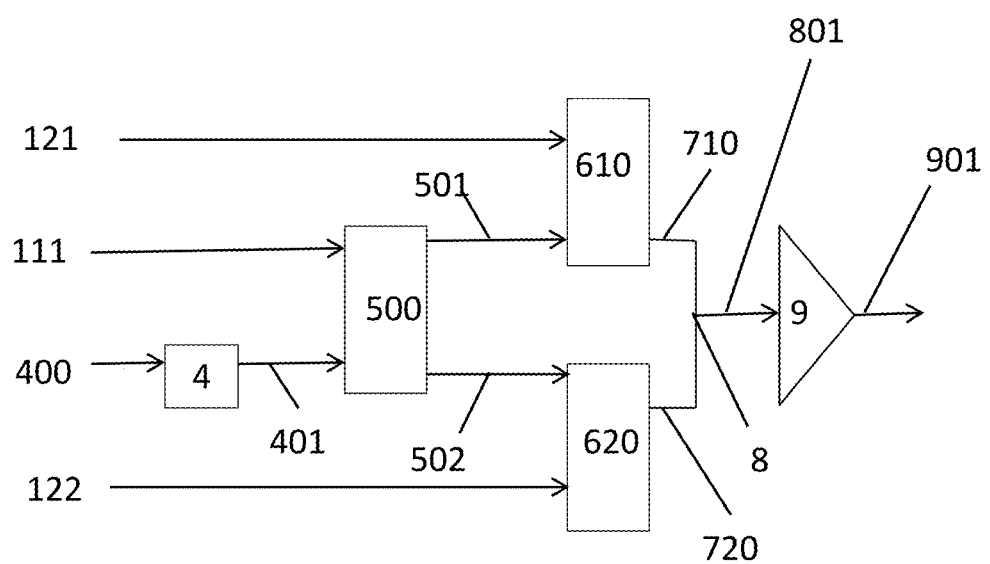
FIG. 5 shows the optical layout of a system which is another embodiment of the invention.

FIG. 5 shows a system according to an alternate embodiment of the invention, in which there is a single layer of mixing units only. The same reference numerals used in FIG. 2 are used to label corresponding elements of FIG. 5. Electromagnetic beam 400 is received by a phase modulator 4, generating electromagnetic primary reference beam 401 having a defined phase. The electromagnetic primary reference beam 401 and data signal 111 are then received by first mixing unit 500, generating mixed signals 501 and 502. Mixed signals 501 and 502 are then received by detection units 610 and 620 respectively, where they are mixed with respective data signals 121 and 122. The photocurrent difference values 710 and 720 output by detection units 610 and 620 are summed in summation unit 8, producing summed difference value 801, which is then amplified in the amplifier 9 to produce an amplified difference value 901.

Although only two embodiments of the invention have been described, many variants are possible within the scope of the invention defined by the claims. For example, in an embodiment of the system having m layers of mixing units arranged in a hierarchical array, it would be possible to omit a certain number of the mixing units in one of more of the layers. For example, one or more mixing units could be omitted in the final layer, such that the mixed signal which would have been received by such a mixing unit is instead received, together with a data signal, by a detection unit. In this case, although the number of layers of mixing units is still m, the number of data signals from which the system can extract data is less than $2^{m+1}-1$.

The invention claimed is:

1. A receiver system for extracting data from a plurality of electromagnetic data signals collectively encoding the data, the system comprising:
    a phase modulator for receiving an electromagnetic beam, and generating an electromagnetic primary reference beam with a defined phase;
    one or more mixing units, each mixing unit being arranged to receive a respective one of the data signals and a reference beam, and to generate two mixed signals, the one or more mixing units including a first mixing unit for which the reference beam is the electromagnetic primary reference beam;
    a plurality of detection units, each detection unit being arranged to receive a respective one of the data signals and a respective mixed signal from one of the mixing units, and to obtain a difference measurement indicative of a difference between the respective data signal and the respective mixed signal; and
    a summation unit, arranged to receive the difference measurements generated by the detection units, and to obtain a summed difference value indicative of the sum of the difference measurements.

2. The receiver system according to claim 1 in which there are a plurality of mixing units, the mixing units being composed of the first mixing unit and one or more additional mixing units, the additional mixing units being arranged to receive, in addition to the respective data signal, a mixed signal generated by another of the mixing units.

3. The receiver system according to claim 2 in which the mixing units are arranged in a hierarchical array having at least two successive layers,
    the first layer comprising the first mixing unit, and
    each other layer of the array comprising, for each mixing unit of the preceding layer, a corresponding pair of mixing units which each receive a respective mixed signal generated by that mixing unit of the preceding layer.

4. The receiver system according to claim 1 in which the number of data signals is $2^{m+1}-1$, where m is an integer greater than zero.

5. The receiver system according to claim 1 further comprising an electronic amplifier arranged to receive the summed difference value from the summation unit, and to perform amplification to generate an amplified difference value.

6. The receiver system according to claim 1 further comprising at least one delay unit positioned on the path of one of the mixed signals between two of the mixing units.

7. The receiver system according to claim 1 further comprising at least one phase modulator positioned on a path of one of the mixed signals between two of the mixing units.

8. The receiver system according to claim 1 further comprising at least one delay unit positioned to modify the delay of a data signal or a mixed signal before that signal is received by a detection unit.

9. The receiver system according to claim 1 further comprising at least one delay unit positioned to modify the delay of a data signal or a mixed signal before that signal is received by a mixing unit.

10. The receiver system according to claim 1, wherein each detection unit is configured to perform homodyne detection.

11. The receiver system according to claim 1, wherein each detection unit is configured to perform heterodyne detection.

12. The receiver system according to claim 1, further comprising at least one first collimating element arranged to receive and collimate a signal travelling on a path towards at least one of the plurality of detection units, and to direct the collimated signal to the at least one of the plurality of detection units.

13. The receiver system according to claim 1, further comprising at least one second collimating element arranged to receive and collimate a signal travelling on a path towards at least one of the one or more mixing units, and to direct the collimated signal to the at least one of the one or more mixing units.

14. The receiver system according to claim 1 further comprising a receiver array comprising a respective set of spaced apart signal receiver units arranged to receive the respective data signals and transmit them to the corresponding ones of the mixing units and detection units.

15. The receiver system according to claim 1, further comprising one or more local oscillators configured to generate the electromagnetic beam.

16. The receiver system according to claim 1, wherein the one or more local oscillators are coherent lasers.

17. The receiver system according to claim 1 comprising an interface unit for receiving the electromagnetic beam over a quantum transmission channel.

18. The receiver system according to claim 17 further comprising a receiver array comprising a respective set of spaced apart signal receiver units arranged to receive the respective data signals and transmit them to the corresponding ones of the mixing units and detection units, and wherein the interface unit is one of the receiver units, and is arranged to receive the respective data signal and the electromagnetic beam over a single channel, the system further comprising a beam splitter unit to split the input electromagnetic signal from the electromagnetic beam.

19. The receiver system according to claim 17, wherein the interface unit provides an interface of the receiver system with an optical fiber.

20. A communication system, the communication system comprising a receiver system for extracting data from a plurality of electromagnetic data signals collectively encoding the data, and a transmitter system arranged to generate the data signals, the receiver system comprising:
    a phase modulator for receiving an electromagnetic beam, and generating an electromagnetic primary reference beam with a defined phase;
    one or more mixing units, each mixing unit being arranged to receive a respective one of the data signals and a reference beam, and to generate two mixed signals, the one or more mixing units including a first mixing unit for which the reference beam is the electromagnetic primary reference beam;

a plurality of detection units, each detection unit being arranged to receive a respective one of the data signals and a respective mixed signal from one of the mixing units, and to obtain a difference measurement indicative of a difference between the respective data signal and the respective mixed signal; and a summation unit, arranged to receive the difference measurements generated by the detection units, and to obtain a summed difference value indicative of the sum of the difference measurements.

21. A method for extracting data from a plurality of electromagnetic data signals collectively encoding the data, the method comprising:

generating an electromagnetic primary reference beam with a defined phase;

receiving, by one or more mixing units, a respective one of the data signals and a reference beam, and generating two mixed signals, the one or more mixing units including a first mixing unit for which the reference beam is the electromagnetic primary reference beam;

receiving, by a plurality of detection units, a respective one of the data signals and a respective mixed signal from one of the mixing units, and obtaining a difference measurement indicative of a difference between the respective data signal and the respective mixed signal; and generating a summed difference value indicative of the sum of the difference measurements.

\* \* \* \* \*